M. G. HUBBARD.
Harvester.

No. 82,415.

3 Sheets—Sheet 1.

Patented Sept. 22, 1868.

Witnesses.
George E. Buckley
W. A. McKinny

Inventor.
George Harding
att for M. G. Hubbard

M. G. HUBBARD.
Harvester.

No. 82,415.

3 Sheets—Sheet 3.

Patented Sept. 22, 1868.

Witnesses.
George E. Buckley
W. A. A. McInnley

Inventor.
George Harding
atty for M. G. Hubbard

UNITED STATES PATENT OFFICE.

MOSES G. HUBBARD, OF SYRACUSE, NEW YORK, ASSIGNOR TO HUBBARD MOWER COMPANY.

IMPROVEMENT IN HARVESTERS.

Specification forming part of Letters Patent No. 82,415, dated September 22, 1868.

*To all whom it may concern:*

Know all men by these presents that I, MOSES G. HUBBARD, of the city of Syracuse, in the State of New York, have invented certain new and useful Improvements in Grass and Grain Harvesters; and that the following is a correct description thereof, reference being had to the drawings hereto attached and forming a part of this specification.

Figure 1:
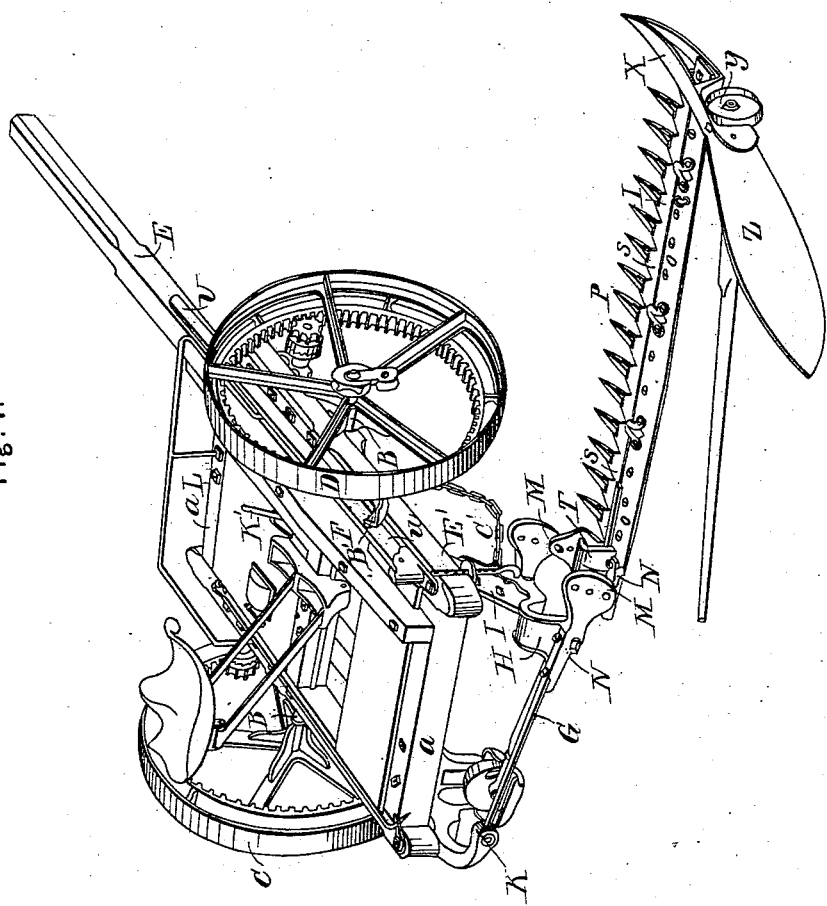
Figure 2:
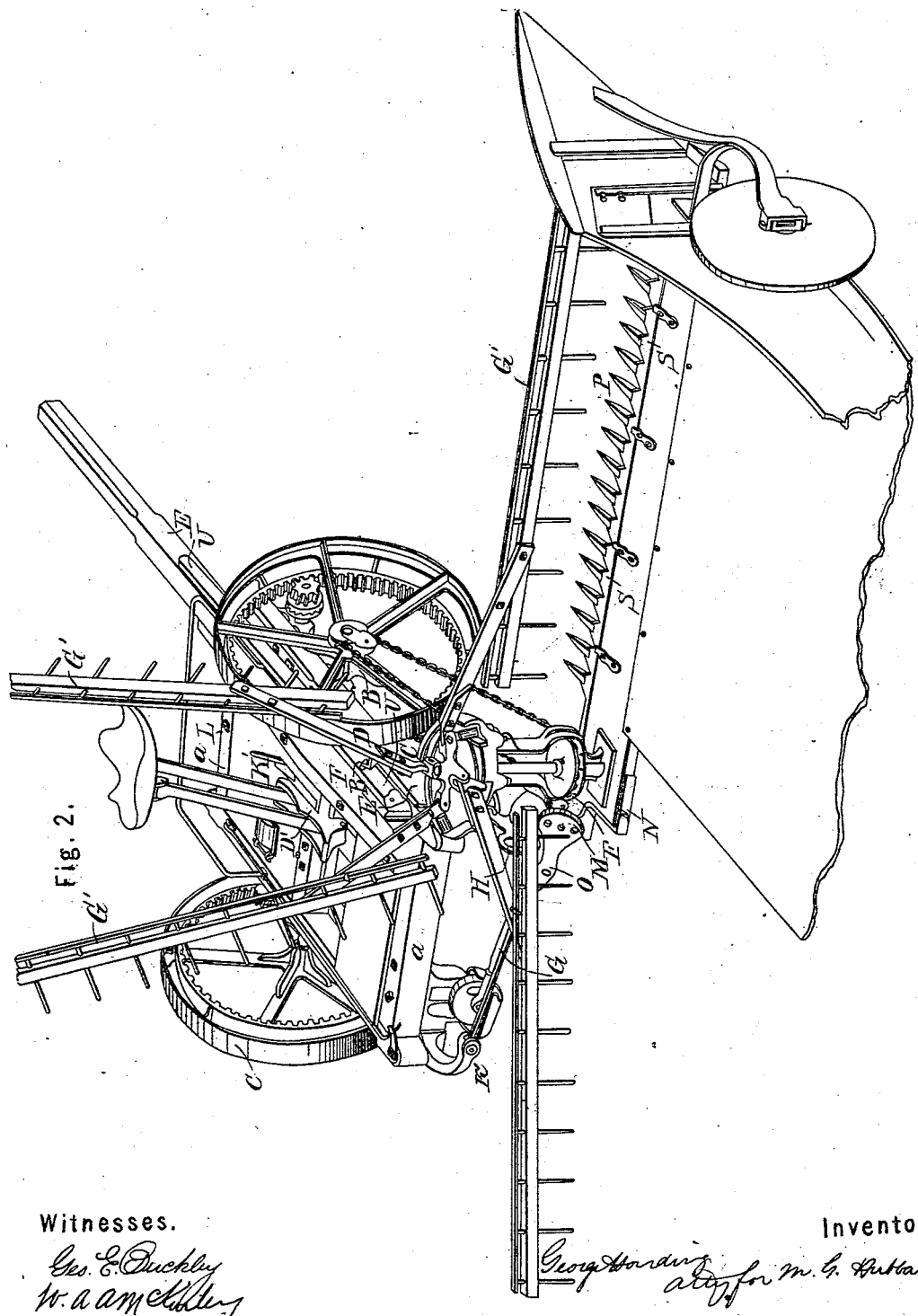
Figure 3:
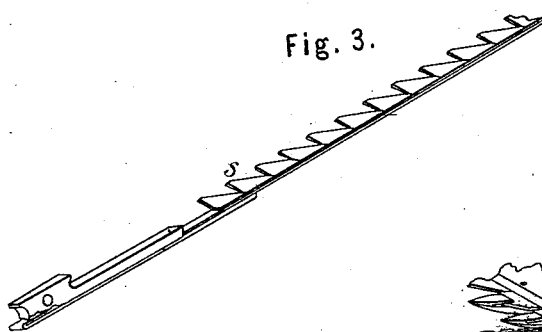
Figure 4:
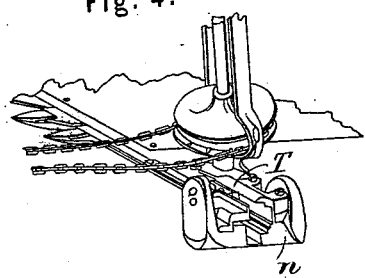
Figure 5:
Figure 6:
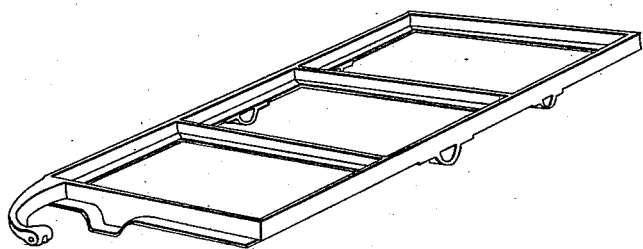

The said drawings are numbered and designated as follows: Figure 1 is a perspective view of my mowing-machine complete. Fig. 2 is a perspective view of my self-raking reaping-machine complete. Fig. 3 is a perspective view of my reaper cutting apparatus detached. Fig. 4 is a detached view of the inner end of my reaper cutting apparatus. Fig. 5 is a detached view of one of my guard-fingers. Fig. 6 is a perspective view of my iron main frame.

The general construction of my improved harvester may be described as follows, viz: I construct the main frame A either of hard wood or cast-iron in the peculiar form and manner hereinafter described, and I support this frame on the main shaft B, which is supported by the two large wheels C and D. In order to keep this main frame steady and in a uniform position, I attach the tongue or pole E rigidly thereto; and in order to adapt the front end of this pole to different-sized horses without changing the level of the main frame, I make the pole attachment adjustable by bolting the pole to the side of the piece F, which I call the "pole-extension," with several different holes arranged one above the other, at a suitable distance apart, for convenient adjustment of the front end of the pole; and in order to adapt my machine to the two processes of reaping and mowing, I have this attachment so arranged that I can bolt the pole onto one side of the pole-extension for mowing and onto the other side of it for reaping, as will be hereinafter more fully described.

The main frame requires to be made as stiff as possible, to support the gearing and keep it in line. For this purpose the sills should stand edgewise, and after long experience and experiment I have arrived at the form of construction shown, for the double purpose of attaining great stiffness and strength, and the formation of a very convenient inclosure to protect the driver and hold tools and other conveniences for working the machine. Thus by placing these main-frame sills edgewise I obtain an unusual rigidity in the frame, and by attaching the bottom boards to the bottom edges of the sills the said inclosure is formed very cheaply and conveniently, and these bottom boards thus add largely to the diagonal stiffness of the main frame. I extend across this main frame such intermediate cross-sills as are required for the support of the gearing and formation of a smaller apartment, which is securely covered by a hinged lid, for the safe-keeping of small and valuable tools. The manner in which the pole-extension is bolted to the main frame adds considerably to its general strength and stiffness, and, together with the peculiar form of my frame, enables me to support the inner end of the reaping attachment from the rear corner of the main frame without springing it out of line, and thereby cramping the gearing.

I will now more minutely describe the construction of my machine when arranged for mowing grass, which has heretofore been considered such a distinct process as to require a machine in nearly all respects different from a reaper; but by a long experience in the construction of mowers and reapers I have succeeded in combining all of the essential elements of the gearing and driving powers for both purposes in a two-wheeled, convenient, substantial, and cheaply-constructed truck, in all respects precisely adapted to the construction of either a mower or a reaper. Therefore, in order to construct the most perfect mower, I have only to attach my improved mowing cutting apparatus to such a truck as previously described. This attachment I effect by first forming an elastic yielding corner, composed of the extension-iron G, and the wear-plate H, and the surface-spring I.

The extension-iron G is pivoted to the main frame at K, and the surface-spring is so attached to the main frame at L as to be entirely free while the cutting apparatus is at work on the ordinary level, but will so cramp the surface-spring, when the cutting apparatus is raised by passing over a stone or other obstacle, that the upward tendency of the cutting apparatus and its inertia will be instantly overcome, and it will be started downward so quickly as to waste very little grass and cause no apparent imperfection in the work; and this same feature of my elastic attachment holds good to prevent the cutting apparatus from dropping so far below the level as to cramp or break the pitman or cutting-bar attachments. This connection I form by introducing between the surface-spring and frame-sill a large oval washer, and then forming a large bolt, with a head oval on both sides; and this bolt, being passed up through the spring and washer and frame-sill, and secured on the top by a strong nut, firmly clasps the surface-spring between two oval surfaces, producing a practical result of great importance in the working of a mowing-machine. To this yielding corner I hinge my improved cutting apparatus at m by a peculiarly-constructed hinge, which I will now minutely describe. It is formed by two strong ears projecting out from the side of the wear-plate H, and two corresponding ears projecting up from the inner shoe n, and strong pins passing through these ears, thus forming the main hinge. (The ears projecting out from the wear-plate H are extended upward about three inches, to permit several higher pairs of pin-holes, to add so much to the height of the rakes and cutters in reaping, and to adjust the level of the platform. This is frequently found to be of great importance, especially in western grain.) To this inner shoe thus hinged I attach the finger-beam O, which I generally make of steel, in order to give it greater strength and stiffness, and to this finger-beam I attach my improved guard-fingers, one of which is marked P, Fig. 5. These guard-fingers have the ordinary open slot, through which the cutters vibrate; but they are of peculiar construction and form. They are so constructed as to allow the cutter-bar to project about one-fourth of an inch in front of the finger-beam, in order to attain a less abrupt shoulder, as shown at R in detached Fig. 5, and the finger is of such form that its section would be a hexagon of unequal sides, as shown, and these sides are made flat, in order to facilitate polishing and finishing the fingers on a grindstone or emery-wheel.

The cutter-bar S, I make of the best quality of steel, to attain great strength and extreme lightness; and in order to avoid the almost fatal tendency of ordinarily-formed cutter-bars to crystallize and break at the inner end, I form the inner end of two or more pieces, and thereby obviate the peculiar vibration of particles which the rapid concussions caused in working the bar while mowing almost invariably produce, causing the crystallization which is so fatal to the strength of ordinary cutter-bars. The breakage of these cutter-bars has for years been a serious difficulty in working such highly-speeded cutters as experience shows to be desirable for harvesting grass or grain on ordinary seeded land; but my improved cutter-bar, as above described, and shown in detached drawing, Fig. 3, effectually prevents all such breakage; and, when its inner end is confined and held in place by a cap fitting over the top of the cutter-bar head, as shown at T, the great wear and consequent concussions are diminished, and great stability and durability attained.

It is sometimes desirable to check the downward motion of the outer end of the cutting apparatus, to admit of controlling and raising it by the raising-lever u in passing over large obstructions, such as large stones and stumps. I accomplish this by means of the set-screw V, which can be turned down against the inner shoe, and thus prevent the outer end of the cutting apparatus from dropping, and it will at once be seen that this arrangement admits of any desired degree of flexibility to the cutting apparatus. (The set-screw V should be removed entirely when the reaping-platform is attached.)

To the outer end of the finger-beam I attach my improved outer shoe X. This shoe is so formed as to divide the grass and give the outer cutter space in which to stop and change its motion, and at the same time project backward and form a strong point for attaching the outer carrying-wheel Y, with several bolt-holes for vertical adjustment for cutting different heights of stubble, and also form a jaw for hinging the track-clearer Z thereto. I accomplish all these objects in one piece of casting by making it in the peculiar form shown, and thus present a uniform and uninterrupted outline from the point of the shoe to the rear end of the track-clearer, and the grass is thus parted and divided perfectly. This is a very important element in mowing, and in some kinds of grass requires great perfection of construction to work successfully. I have found the peculiar form of shoe, as shown, with its projecting roof extending from its point back to its rear end and entirely over the adjustable carrying-wheel, to be the only form of construction which combines all the necessary elements for good work in all kinds of grass. The inner end of cutting apparatus is adjusted vertically by the adjusting-rod E.

I will now describe my improved raising-lever for controlling the cutting apparatus and raising it over obstacles while at work. The principal objects to be attained in this element of a mower are convenience for the operator and quickness of operation. My former plans for constructing a raising-lever have not raised the cutting apparatus high enough and quickly enough to pass large obstacles while at work; and to accomplish these several objects I have found it necessary to make a new device, composed of the raising-handle u and the cam B' and the chain C', located and attached as shown, by means of which combination the operator, by raising the said handle, causes the chain to wind around the cam and thus take up very rapidly, while its convenience of location renders the process of elevating the cutting apparatus very easy and almost instantaneous, and this cam admits of the lever being so located with reference to the point of attachment of the lower end of the chain as to cause the chain to pass back of the lower end of the lever when it is raised, the weight holding the lever back against the back side of the lever-jaw, causing it to be self-sustaining.

It is sometimes necessary to raise the cutting apparatus into a vertical position to pass trees and other high obstacles, and it is very convenient to sustain it in that position for transportation. For this purpose I use a rod, which I call a "sustaining-rod," secured to the frame by one eye at the rear of the frame and one in front, in a convenient position for the driver to grasp it quickly; and on one end of this rod I form a hook, which may be hooked into the staple I in the finger-beam, and then the operator can instantly pull up the cutting apparatus to the side of the machine for passing obstacles; but when this is done the machine should be previously shifted out of gear; and to facilitate this process I locate the gear-shifter handle immediately in front of the operator at k', so that he may readily, by a forward movement of the handle, shift the gear with his foot or hand. The operator can thus instantly shift the gear and pull up the cutting apparatus to the side of the machine, pass the obstacle, drop the cutting apparatus, shift the gear, and continue his work with the least possible inconvenience or interruption.

When the cutting apparatus is raised and sustained on the rear end of the truck, its weight, added to the weight of the driver, would cause the front end of the machine to tip up; and to obviate this result I make the driver's seat movable, so that the driver can readily change his position to the front end of the machine; and as the surface over which these machines are drawn is usually quite rough, it is very important for the comfort of the driver that the seat should rest on easy springs; and in shipping and storing these machines it is often convenient to detach the seat; and to adapt the seat attachment to all these purposes, I form two suitable recesses in the iron plate D', and pivot therein two pieces of spring-steel, as shown, and the seat is pivoted to the upper ends of these springs. The front and rear sides of the said recesses are of such an angle as to cause the springs to stand at about an angle of forty-five degrees, which will give the seat a movement of about two feet. In this way the seat may be instantaneously changed to balance the machine, the driver is comfortably riding on long, easy springs, and the seat may be detached for storage or shipping by merely removing the two pins by which the springs are pivoted to the machine.

In order to convert this machine into a reaper, I change the pole over to right side of pole-extension and detach the mowing cutting apparatus. I then place the inner shoe of the reaping attachment within the wear-plate ears, and a new machine is formed, of new proportions, and adapted to entirely different work.

The surface of grain-fields is usually much more uneven than meadows, and therefore the cutters require to be higher, and the crop is often tangled so as to require great perfection of raking apparatus to gather the cut grain on the platform, and experience has shown that the grain should be delivered from the platform in gavels by the same process which gathers it onto the platform. Experience has also shown that the swath cut in grain may be considerably wider than in grass with the same power. I therefore make my reaping cutting apparatus about one-fourth wider. For gathering the grain onto the platform and delivering it into gavels around at the side automatically, I prefer the apparatus usually known as the "Johnston self-rake," which I attach to the inner side of my improved reaping attachment, as shown at F, and thus I form a complete two-wheeled self-raking reaper. This is best accomplished by what is usually termed a "sweep-rake," to use which the raker would sit on the rear of the machine in the usual way, gather in his crop with his rake until he had accumulated sufficient for a gavel, and then, by a circular motion, sweep it around on a natural curve and off at the side of the platform. To do this effectually with a sweep-rake requires that the inner line of cut should be a considerable distance from the raker, so that the inner end of his rake will have sufficient range of movement to carry in the cut grain and sweep it around, and form a complete compact gavel. To get this increased range of movement, I locate the first guard-finger about fifteen inches out beyond the inner shoe, and extend the cutter-bar (without cutters) from this point into the inner shoe to a suitable point to connect with the ordinary mowing-pitman. I thus get a range of movement for the inner end of the rake which effectually sweeps in all the cut grain and delivers it effectually.

In gathering and delivering thick, tangled grain, the rakes G' require to be as wide as they can conveniently be made, in order to prevent the rake from passing under a portion of the grain on the platform. It has been difficult to get a rake sufficiently wide and sufficiently light; but I find that by allowing the rake-teeth to pass up through the rake-head about four inches, and placing a small round stick on their upper ends to prevent grain from lodging on them, a very wide and a very light rake is formed, and the teeth projecting below the rake-head are short, and consequently strong, and when one breaks it can readily be driven out and a new one substituted. I sometimes cover these rakes with canvas to insure clean work.

I have found it necessary to so attach the driver's seat on a reaping-machine that it should be elastic in a forward direction, as well as downward, to protect the driver against the severe jerking motion caused by dropping into "dead furrows," of which there is a great number in ordinary grain-fields. This peculiar result I attain by turning my above described driver's seat forward, so that it not only balances the reaping attachment, but it also brings the seat-springs into such position that their action is about as much in a forward direction as downward, and in this way they entirely avoid the peculiar jarring and jerking motion caused by dropping into dead furrows or striking any large obstacles, such as stones, which are very common in ordinary grain-fields.

Having thus fully described my improvements in harvesters, what I claim therein as new, and desire to secure by Letters Patent, is—

1. The curved wear-plate H, provided with the expanded perforated ears, whereby the height of the cutting apparatus can be adjusted without interfering with the action of the straight pitman, substantially as set forth.

2. The independent or detachable sustaining-rod, by means of which the driver in his seat on the machine is enabled to raise and sustain the cutting apparatus, substantially as described.

M. G. HUBBARD.

Witnesses:
GEO. E. BUCKLEY,
J. H. MYERS.